Aug. 8, 1967  R. BERANGER  3,334,572
DOMESTIC COFFEE MAKER
Filed July 8, 1964
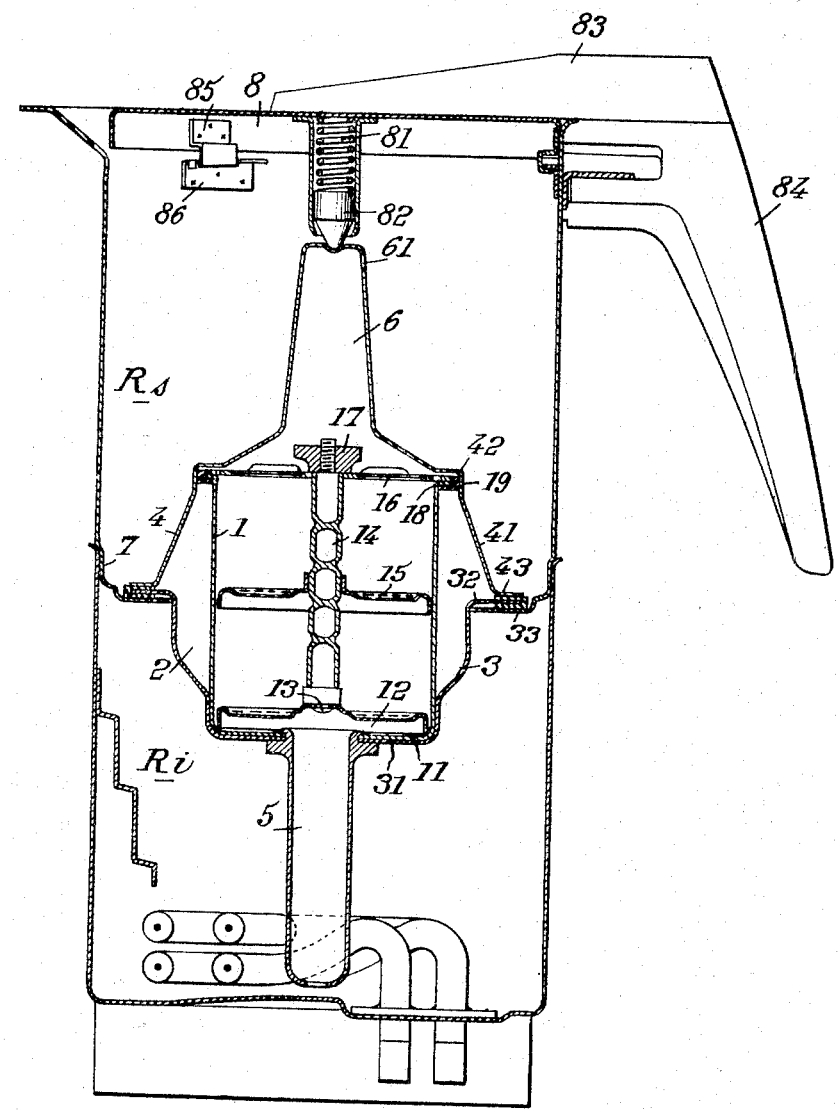
INVENTOR.
RAYMOND BERANGER
BY
*Frank R. ...*
AGENT 3,334,572
DOMESTIC COFFEE MAKER
Raymond Beranger, Paris, France, assignor to North American Philips Company, Inc., New York, N.Y., a corporation of Delaware
Filed July 8, 1964, Ser. No. 381,094
Claims priority, application France, July 25, 1963, 942,609
2 Claims. (Cl. 99—292)

The present invention relates to improved domestic coffee maker and more particularly to coffee maker in which water is forced through a quantity of ground coffee under pressure at high temperature.

A known type of such a coffee maker comprises a bipartite body, i.e. a lower receptacle and an upper receptacle, separated by a demountable basin containing the ground coffee and provided with two ducts opening out in each of the two recipients, which basin is mounted by means of an elastic member so that any risk of explosion in the event of excessive pressure is avoided.

The known coffee makers provide coffee of good quality, but they require a large quantity of ground coffee for each fresh brew; since the coffee grind basin has a large diameter, the water impregnates the coffee grind to a greater extent in the central part than at the outer parts, so that the ground coffee is not completely utilized.

It is also known to use grind basins of small diameter, but their use in coffee machines of the type set forth is difficult, since the heat exchange between the coffee container and the coffee brew may be such that the brew is likely to start boiling.

The present invention tends to eliminate these various disadvantages.

In accordance with the invention improvements in the coffee maker comprises a lower water receptacle and an upper brew receptacle, separated by a container for the ground coffee including a pump, mounted communicating via two opposite ducts opening out in the two receptacles is mainly characterized in that the coffee container having a smaller diameter than the recipients, is surrounded by a hermetically closed annular compartment, the wall of which, together with the outer wall of the coffee container forms a thermally insulated zone.

The invention will now be described more fully with reference to the accompanying drawing, which is a sectional view of a coffee percolator according to the invention.

In the drawing only those parts which contribute to a good understanding of the invention are designated by reference numbers. As a matter of course, the device comprises in the lower water receptacle R$i$ electrical resistors for heating the water, whereas the upper brew receptacle R$s$ constitutes a decanting receptacle having a fixed handle and a spout.

The container 1 for the ground coffee, having a diameter which is considerably smaller than that of the receptacles is surrounded by an annular compartment 2 comprising the heat insulating zone.

The drawing shows the inner member of the coffee grind container 1, which will be described only briefly, since this member is not essential for this invention.

The bottom 11 of the coffee container 1 has a central opening and is provided with a filter 12, for example of aluminum, on which a screw 13 is mounted, which constitutes the axis of the container throughout its length. A center post 14 (which may carry measuring indicia) on said screw is connected with a dosing element 15 which constitutes a filter, the variable position of which permits of regulating the quantity of grind in accordance with the desired number of cups of coffee. The coffee grind is poured into the upper part of the container 1 above the dosing element. It should be noted that the dosing element 15, forms a scraper which, may facilitate cleaning of the container. A fine filter 16, for example of a polyamide, having a slightly larger diameter than the container and adapted to the screw 13, is held by a tapped nut 17, for closing the container 1. The thermal exchange compartment 2 is formed by two parts, i.e., the lower cup-like part 3 and an upper hood part 4.

The lower part 3 of cylindrical shape and small height, is connected with the lower part of the coffee container 1, while the bottoms 11 and 31 each have an opening, accommodating a lower duct 5 through which the water can pass towards the coffee grind under action of the vapour pressure. The diameter of the central portion of the element 3 increases gradually and reaches in the upper portion, a constant diameter which is larger than the diameter of the container 1. Said central portion thus has substantially the shape of a truncated cone. The upper projecting rim 32 of the element 3 is covered by a connecting member 33 of flexible material, for example rubber, by means of which it is connected with a projecting part 7 inside the pot, which projection forms a seat in the middle of the pot.

The element 4 has a lateral frustoconical part 41, the smallest diameter of which is equal to that of the upper part 42 of the filter 16; this part, which has a small lateral depth, matches the upper projecting rim 18 of the container 1 by means of a sealing connection 19 of flexible material covering said rim. The element 4 is prolonged above the container by an upper duct 6, provided with outlet ports 61 and bears with its lower projecting rim 43 on the connecting member 33.

The assembly may be held in place by any known means capable of holding the duct 6 and the element 4 on the connecting member 33.

In this manner the elements 3 and 4 and the lateral wall of the container 1, define an air pocket serving as a thermal insulator.

By way of example there will now be described a possible use of the duct 6 and the element 4 on the connecting member 33 as shown in the drawing. The lid 8 for closing the coffee maker is provided on the inner side, at its centre, with a spring 81, the free end of which is formed by a cone 82. Upon closure, the element 82 exerts via the spring 81 a pressure on the duct 6, so that said duct and the element 4 are both held on the connecting member 33; the element 82 and the spring 81 thus constitute a safety valve on the lid.

On the outer side the lid is provided with a locking handle 83 and on the inner side with extensions 85 which match corresponding elements 86 on the inner side of the receptacle R$s$ forming a clamping flange. The lid can be closed in a simple manner by slightly pressing down and slightly turning the lid so that the elements 85 come into contact with the clamping flange 86, so that the handle 83 is, after the closure, integral with the fixed handle 84 of the upper recipient. Such a simple closure might also be obtained in the same maner by providing the lid with the clamping flange and the inner side of the machine with the extensions.

The lid is preferably made of plastics material, for example a polyamide which has the double advantage of a smooth fit, when it is put in its place, and of limiting its temperature always to below 50° C.

In operation the vapour pressure causes the water to rise in the duct 5 and since the container 1 is of small size, the grind is impregnated homogeneously throughout the width of the container. Under these conditions the grind can assume a high temperature such that the infused water or brew in the upper receptacle R$s$ after passing through the openings 6 of the duct could start boiling if said brew were not insulated from the grind container by the heat-exchange compartment. These improvements, which may be applied to various types of coffee machines, have the double advantage of avoiding boiling of the coffee brew and of limiting the quantity of coffee grind for obtaining the same results with respect to quality owing to the homogeneous impregnation of the grind.

The invention is not limited to the example given above and in particular modifications of the shape of the heat-exchange compartment, of the safety system and the closing system fall within the scope of this invention.

What is claimed is:

1. In a coffee maker comprising a lower water receptacle in connecting sealed relation with an upper brew receptacle, said upper receptacle having a lid member; a coffee grind container; means for transferring water from said lower receptacle through said grind container and into said upper brew receptacle; the improvement comprising: an upper hood portion adapted to be positioned internally of said upper brew receptacle; a lower cup portion adapted to be positioned internally of said lower water receptacle, said upper hood portion and said lower cup portion being in sealed confronting engagement; said grind container being positioned internally of said hood portion and said cup portion with the wall of the grind container being in radical spaced relations with the wall of said hood portion and said cup portion; first sealing means separating said grind container and said hood portion and second sealing means between said cup and said grind container; said first and second sealing means, said grind container wall and said hood wall defining a hermatically sealed air pocket, said air pocket providing a thermal insulation between said grind container and said upper brew receptacle for limiting heat transfer from said grind container to said brew receptacle.

2. In a coffee maker according to claim 1, duct means for transmitting the water from the lower receptacle to the brew receptacle comprising a lower duct attached to the lower cap portion and communicating with said liquid receptacle; upper duct means attached to the hood portion and communicating with said receptacle, said upper duct means confronting the under surface of the lid member on said brew receptacle, and spring means attached to said lid for engaging said upper duct and thereby locking said upper duct, hood portion and cup portion in fixed relationship.

References Cited
UNITED STATES PATENTS
2,685,248    8/1954    Ohlsson _____ 99—303

FOREIGN PATENTS
824,112    11/1937    France.
563,153    5/1957    Italy.
586,464    12/1958    Italy.

WILLIAM I. PRICE, *Primary Examiner.*

WALTER A. SCHEEL, *Examiner.*

S. P. FISHER, *Assistant Examiner.*